(12) United States Patent
Ginter et al.

(10) Patent No.: US 9,430,935 B2
(45) Date of Patent: Aug. 30, 2016

(54) EMERGENCY EVENT MESSAGE

(71) Applicants: Thomas Ginter, Bellevue, WA (US);
Donald L. Mitchell, Bellevue, WA (US); Roger S. Marshall, Auburn, WA (US); Todd Poremba, Seattle, WA (US); Stephen Lee Harrison, Sammamish, WA (US)

(72) Inventors: Thomas Ginter, Bellevue, WA (US);
Donald L. Mitchell, Bellevue, WA (US); Roger S. Marshall, Auburn, WA (US); Todd Poremba, Seattle, WA (US); Stephen Lee Harrison, Sammamish, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/334,317

(22) Filed: Jul. 17, 2014

(65) Prior Publication Data
US 2015/0170507 A1    Jun. 18, 2015

Related U.S. Application Data

(60) Provisional application No. 61/915,993, filed on Dec. 13, 2013, provisional application No. 61/916,007, filed on Dec. 13, 2013.

(51) Int. Cl.
G08B 1/08        (2006.01)
G08B 27/00       (2006.01)
H04L 29/08       (2006.01)
H04W 4/14        (2009.01)
H04W 4/22        (2009.01)

(52) U.S. Cl.
CPC ............. *G08B 27/005* (2013.01); *H04L 67/02* (2013.01); *H04L 67/12* (2013.01); *H04L 67/18* (2013.01); *H04W 4/14* (2013.01); *H04W 4/22* (2013.01)

(58) Field of Classification Search
CPC ....... G08B 27/005; H04L 67/02; H04W 4/22
USPC ............. 340/506, 539.1, 539.11, 539.13, 3.1
See application file for complete search history.

(56) References Cited

U.S. PATENT DOCUMENTS

| 5,400,246 A * | 3/1995 | Wilson et al. .................. 700/17 |
| 6,035,016 A * | 3/2000 | Moore ................. H04M 11/022 379/37 |
| 8,588,733 B2 | 11/2013 | Ferguson et al. |
| 2005/0143049 A1 | 6/2005 | Hoke, Jr. |
| 2012/0166626 A1 | 6/2012 | Rai et al. |
| 2013/0237181 A1 | 9/2013 | Ray |

* cited by examiner

*Primary Examiner* — Daryl Pope
(74) *Attorney, Agent, or Firm* — Tarolli, Sundheim, Covell & Tummino LLP

(57) ABSTRACT

A gateway can be configured to receive an emergency event message in a predefined format via a network. The emergency event message can characterize a location and a nature of an emergency event. The gateway can also be configured to identify a particular Public Safety Answering Point (PSAP) customer premise equipment (CPE) to service the emergency event. The gateway can further be configured determine a format of messages employable by the particular PSAP. The gateway can still further be configured to provide the particular PSAP CPE with an output message in the format employable by the particular PSAP CPE. The output message can characterize the nature and the location of the emergency event.

28 Claims, 8 Drawing Sheets

```xml
<?xml version="1.0" encoding="UTF-8"?>
<findService
        xmlns="urn:ietf:params:xml:ns:lost1"
        xmlns:p2="http://www.opengis.net/gml"
        serviceBoundary="value"
        recursive="true">
        <location id="6020688f1ce1896d" profile="geodetic-2d">
            <p2:Point id="point1"
        srsName="urn:ogc:def:crs:EPSG::4326">
        <p2:pos>37.775 -122.422</p2:pos>
        </p2:Point>
        </location>
        <service>urn:service:sos.police</service>
</findService>
```

FIG. 3

```xml
<?xml version="1.0" encoding="UTF-8"?>
    <findServiceResponse xmlns="urn:ietf:params:xml:ns:lost1"
    xmlns:p2="http://www.opengis.net/gml">
    <mapping
            expires="2007-01-01T01:44:33Z"
            lastUpdated="2006-11-01T01:00:00Z"
            source="authoritative.example"
            sourceId="7e3f40b098c711dbb6060800200c9a66">
    <displayName xml:lang="en">
            New York City Police Department
    </displayName>
    <service>urn:service:sos.police</service>
    <serviceBoundary profile="geodetic-2d">
        <p2:Polygon srsName="urn:ogc:def::crs:EPSG::4326">
            <p2:exterior>
                <p2:LinearRing>
                    <p2:pos>37.775 -122.4194</p2:pos>
                    <p2:pos>37.555 -122.4194</p2:pos>
                    <p2:pos>37.555 -122.4264</p2:pos>
                    <p2:pos>37.775 -122.4264</p2:pos>
                    <p2:pos>37.775 -122.4194</p2:pos>
                </p2:LinearRing>
            </p2:exterior>
        </p2:Polygon>
    </serviceBoundary>
    <uri>sip:nypd@example.com</uri>
    <uri>xmpp:nypd@example.com</uri>
    <serviceNumber>911</serviceNumber>
    </mapping>
    <path>
        <via source="resolver.example"/>
        <via source="authoritative.example"/>
    </path>
    <locationUsed id="6020688f1ce1896d"/>
    </findServiceResponse>
```

FIG. 4

```
<?xml version="1.0" encoding="UTF-8"?>
    <findService xmlns="urn:ietf:params:xml:ns:lost1"
    recursive="true" serviceBoundary="value">
    <location id="627b8bf819d0bad4d" profile="civic">
        <civicAddress
            xmlns="urn:ietf:params:xml:ns:pidf:geopriv10:ci
        vicAddr">
            <country>DE</country>
            <A1>Bavaria</A1>
            <A3>Munich</A3>
            <A6>Otto-Hahn-Ring</A6>
            <HNO>6</HNO>
            <PC>81675</PC>
        </civicAddress>
    </location>
    <service>urn:service:sos.police</service>
</findService>
```

FIG. 5

```xml
<?xml version="1.0" encoding="UTF-8"?>
<findServiceResponse xmlns="urn:ietf:params:xml:ns:lost1">
    <mapping
            expires="2007-01-01T01:44:33Z"
            lastUpdated="2006-11-01T01:00:00Z"
            source="esgw.ueber-110.de.example"
            sourceId="e8b05a41d8d1415b80f2cdbb96ccf109">
        <displayName xml:lang="de">
            Muenchen Polizei-Abteilung
        </displayName>
        <service>urn:service:sos.police</service>
            <serviceBoundary
                profile="civic">
                <civicAddress
                        xmlns="urn:ietf:params:xml:ns:pidf:geopriv10:civicAddr">
                    <country>DE</country>
                    <A1>Bavaria</A1>
                    <A3>Munich</A3>
                    <PC>81675</PC>
                </civicAddress>
            </serviceBoundary>
        <uri>sip:munich-police@example.com</uri>
        uri>xmpp:munich-police@example.com</uri>
        <serviceNumber>110</serviceNumber>
    </mappng>
    <path>
        <via source="esgw.ueber-110.de.example"/>
        <via source="polizei.muenchen.de.example"/>
    </path>
    <locationUsed id="627b8bf819d0bad4d"/>
</findServiceResponse>
```

FIG. 6

EMERGENCY EVENT MESSAGE

CROSS-REFERENCE TO RELATED APPLICATIONS

This application claims the benefit of priority to U.S. Provisional Application No. 61/916,007, filed on Dec. 13, 2013, and entitled DELIVERY OF ASAP MESSAGES OVER AN SIP-MSRP BASED NETWORK. This application also claims the benefit of priority to U.S. Provisional Application No. 61/915,993 filed on Dec. 13, 2013 and entitled A SYSTEM FOR THE DELIVERY OF ASAP MESSAGES OVER AN IP NETWORK. The entirety of both applications is herein incorporated by reference.

TECHNICAL FIELD

This disclosure relates to emergency event messages.

BACKGROUND

The Automated Secure Alarm Protocol (ASAP) is a national standard that is employed for processing information from alarm monitoring stations needing emergency dispatch. ASAP is a protocol created by the Association of Public Safety Officials (APCO) and the Central Station Alarm Association (CSAA) that can facilitate the rapid transmission of alarms straight to public safety communication centers within seconds after they are verified by a central station. There is no need for a central station operator to make a telephone call to the 911 Public Safety Answering Points (PSAPs) since ASAP sends the alarm message directly to the public safety dispatcher's Computer-Aided Dispatch (CAD) where they can then dispatch the alarm to the appropriate response teams.

SUMMARY

One example relates to a non-transitory computer readable medium storing machine readable instructions comprising a gateway. The gateway can be configured to receive an emergency event message in a predefined format via a network. The emergency event message can characterize a location and a nature of an emergency event. The gateway can also be configured to identify a particular Public Safety Answering Point (PSAP) customer premise equipment (CPE) to service the emergency event. The gateway can further be configured to determine a format of messages employable by the particular PSAP. The gateway can still further be configured to provide the particular PSAP CPE with an output message in the format employable by the particular PSAP CPE, wherein the output message characterizes the nature and the location of the emergency event.

Another example relates to a system comprising a memory configured to store machine readable instructions and a processing unit configured to access the memory and execute the machine readable instructions. The machine readable instructions can include an incoming message handler configured to receive a plurality of emergency event messages transmitted over a network. Each of the plurality of the emergency event messages comprises a message in a given format that characterizes a location and a nature of a corresponding emergency event of a plurality of emergency events. The machine readable instructions can also include a PSAP formatter configured to generate a plurality of output messages for a respective plurality of PSAP CPEs to service the plurality of emergency events. Each of the output messages can be based on a corresponding emergency event message and each of the output messages can be in a format readable by a corresponding PSAP CPE of the plurality of PSAP CPEs.

Yet another example relates to a method that includes receiving an emergency event message from a central station. The method can also include querying, in response to the emergency event message, a Location-to-Service Translation Protocol (LoST) server to identify a particular PSAP CPE of a plurality of PSAPs CPEs to service an emergency event corresponding to the emergency event message. The method can yet further include formatting an output message into a format readable by the particular PSAP.

BRIEF DESCRIPTION OF THE DRAWINGS

FIG. 3 illustrates an example a query to Location-to-Service Translation (LoST) server.

FIG. 4 illustrates an example of a response from a LoST server.

FIG. 5 illustrates another example of a query to a LoST server.

FIG. 6 illustrates another example of a response from a LoST server.

DETAILED DESCRIPTION

This disclosure relates to deploying emergency event messages. The emergency event messages could be received at a gateway (or distributor) and provided from a central station. In response to receipt of each of the emergency event messages, the gateway can query a Location-to-Service Translation Protocol (LoST) server to identify a particular Public Safety Answering Point (PSAP) customer premise equipment (CPE) of a plurality of PSAP CPEs to service an emergency event corresponding to one of the emergency event messages. The gateway can also determine operating characteristics of the particular PSAP and format an output message into a format readable by the particular PSAP. In this manner, the gateway can receive an emergency event message in one format (including Automated Secure Alarm Protocol (ASAP) messages) and provide an output message for PSAPs in another format.

Figure 1:
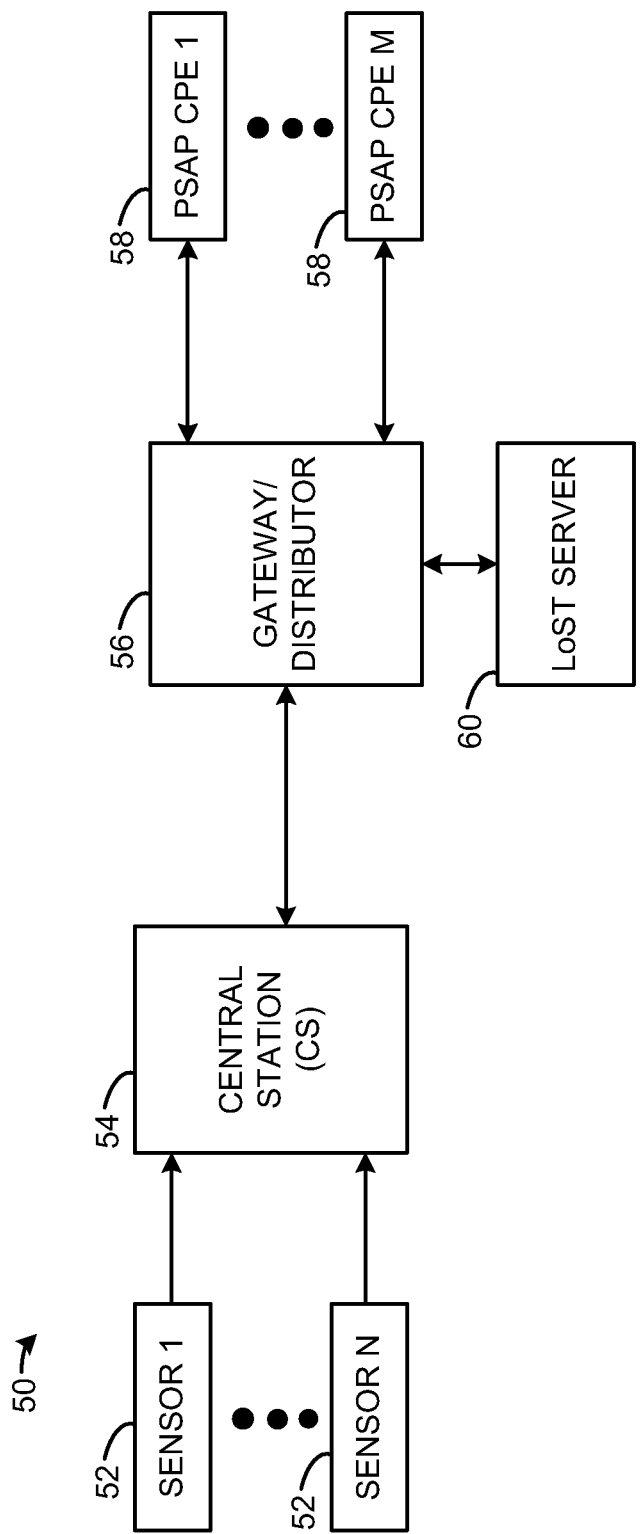
FIG. 1 illustrates an example of a system to deploy emergency event messages.

FIG. 1 illustrates an example of a system 50 for deploying emergency event messages. The system 50 can include N number of sensors 52, where N is an integer greater than or equal to one. Each of the N number of sensors 52 can be implemented, for example as an emergency event sensor. For instance, one or more of the N number of sensors 52 could be a smoke detector (e.g., a fire detector), a home or business security system, a weather detector, a tsunami detector, a hazardous material detector, etc. Moreover, in some examples, one or more of the N number of sensors 52 could be a mobile wireless device (e.g., a wireless phone) that can be configured to detect an emergency event. The system 50 can be designed such that the N number of sensors 52 can be geographically separated by nearly any distance. For instance, a given sensor 52 of the N number of sensors 52 could be located in a given location (e.g., a building in a city) and another sensor 52 of the N number of sensors 52 could be located in another location that is 100s or 1000s of kilometers away from the given location.

In response to detecting an emergency event, a given sensor 52 of the N number of sensors 52 can send an event message to a central station 54. The event message can include, for example, data (raw data) that characterizes the nature of the emergency event and an identifier of the given sensor 52. For example, the event message from a security system could indicate, for example, that a security breach had occurred and point of breach (e.g., kitchen window).

In response to the event message, the central station 54 can generate an emergency event message. The emergency event message can include data that characterizes the emergency event and location information that characterizes a location of the emergency event (e.g., a civic or street address, latitude and longitudinal directions, etc.) and additional ancillary information. Such ancillary information could include, for example, environmental information (e.g., temperature at a location), personal information associated with an end user of an emergency system (e.g., a name, medical condition, etc.) and/or an alarm status (e.g., a status of an alarm at a window), etc. In some examples, the emergency event message can be implemented as an ASAP message that conforms to the National Information Exchange Model (NIEM) and includes an Extensible Markup Language (XML)-content text message. To generate the emergency event message, the event message can be read by an ASAP translator function that can copy content from a "Service Address" or "Service Coordinates" and create the XML content based on a Presence Information Data Format-Location Object (PIDF-LO), or possibly a location key reference. The ASAP message can be provided to a gateway 56. In some examples, the ASAP message can be provided via a public network (e.g., the Internet). Additionally or alternatively, the ASAP message can be provided through a proprietary network, such as the National Emergency Number Association (NENA) i3 Emergency Services Internet Protocol (IP) Network (ESInet) that employs the Session Initiated Protocol and the Message Session Relay Protocol (SIP/MSRP).

In some examples, the emergency event message can be implemented in yet other formats and/or protocols. For example, the emergency event message can be implemented as a short message service (SMS) message (e.g., a text message), an Extensible Messaging and Presence Protocol (XMPP) message, etc. It is to be understood that in other examples, still other formats and protocols can be employed to implement the emergency event message.

The gateway 56 can be configured to acknowledge receipt of the emergency event message. The gateway 56 can be implemented, for example, as a router or other computer system. The gateway 56 can communicate with M number of PSAPs via corresponding CPEs 58, which can be referred to as PSAP CPEs 58, where M is an integer greater than or equal to one. Each PSAP CPE 58 could be, for example, a system (e.g., a computing device) that can be employed to contact and/or dispatch emergency services. Moreover, each CPE 58 can be representative of multiple instances of hardware systems and/or a combination of systems. In some examples, the CPE 58 of a PSAP can be representative of all or part of the computer hardware implemented at the PSAP. The gateway 56 can be configured to determine a consumer of the emergency event message. The consumer of the Emergency event message could be, for example, a PSAP CPE 58.

Each example of the M number of PSAP CPEs 58 can be configured to consume a particular type of data. For instance, a given PSAP CPE 58 could be implemented as a web browser. In such a situation, the given PSAP CPE 58 can be configured to receive Internet Protocol (IP) messages that include messages in the Hypertext Transfer Protocol Secure (HTTPS) format. Another PSAP CPE 58 could be implemented as a Computer-Aided Dispatch (CAD) terminal. In such a situation, the other PSAP CPE 58 could be configured to receive messages in the ASAP format or another format, such as a proprietary format. Still another PSAP CPE 58 could be implemented as a call handling system. In this situation, this PSAP CPE 58 could be configured to receive messages in an SIP/MSRP format. Yet still another PSAP CPE 58 could be implemented as a text-to-911 workstation and/or a teletype (TTY) workstation. The PSAP CPEs 58 could be configured to contact and/or dispatch emergency services (e.g., police, fire departments, ambulatory services, emergency broadcast, etc.). It is noted that the examples given for the PSAP CPE 58 is not meant to be exhaustive. In other examples, other functionality can be included in the PSAP CPEs 58.

To identify the consumer of the emergency event message provided by the central station 54, the gateway 56 can be configured to extract location information (e.g., an address and/or geographic coordinates) related to the emergency event. The gateway 56 can also extract information characterizing the emergency event. The gateway 56 can query a Location-to-Service Translation (LoST) server 60 for a particular (specific) PSAP CPE 58 based on the emergency event message, including, for example, the type of emergency event and the type of sensor 52 that reported the emergency event, etc.

The gateway 56 can receive data that characterizes either a particular PSAP CPE 58 (or multiple PSAP CPEs 58) to provide the emergency data or a "next hop" (e.g., a proxy, such as another LoST server 60) on a network path between the gateway 56 and the particular PSAP CPE 58. In response to the gateway 56 receiving data that characterizes the "next hop" on the network, the gateway 56 can be configured to query another LoST server 60 for the particular PSAP CPE 58 and/or query the same LoST server 60 for the particular PSAP CPE 58 with increased specificity describing the nature of the emergency event and/or the location of the emergency event. After K number of queries to the LoST server(s) 60 (where K is an integer greater than or equal to one), the particular PSAP CPE 58 (or multiple PSAP CPEs 58) can be identified.

In some examples, the particular PSAP CPE 58 can be identified by a uniform resource identifier (URI) and/or a network address (e.g., an IP address, etc.) or other data that uniquely identifies the specific PSAP CPE 58. The gateway 56 can employ a lookup table and/or a database to identify operational characteristics of the particular PSAP CPE 58. For example, the gateway 56 can identify a format of data needed at the particular PSAP CPE 58. The gateway 56 can reformat and/or encapsulate the emergency event message for the specific PSAP CPE 58 to generate an output message. In some examples, such as situations where the particular PSAP CPE 58 includes a web browser, the reformatting can include adding/removing graphical content to the output message.

The gateway 56 can send the output message to the particular PSAP CPE 58. In response to receipt of the output message, a user of the particular PSAP CPE 58 can coordinate action of emergency services. Additionally, upon deployment of emergency services, the particular PSAP CPE 58 can send a status message to the gateway 56 describing a resolution and/or a current status of the emergency event. The gateway 56 can forward the status message (e.g., in an ASAP message format) to the central CPE 54.

By employment of the system 50, the gateway 56 can service multiple different types of PSAP CPEs 58 concurrently. In this manner, the PSAP CPEs 58 need not be tied to a specific proprietary protocol (e.g., ASAP). Additionally, by leveraging the LoST server 60 to determine the specific PSAP CPE 58 that is to service a particular emergency event, the identity of the specific PSAP CPE 58 can be changed in real-time due to network traffic and/or operational status of the M number of PSAP CPE 58.

Figure 2:
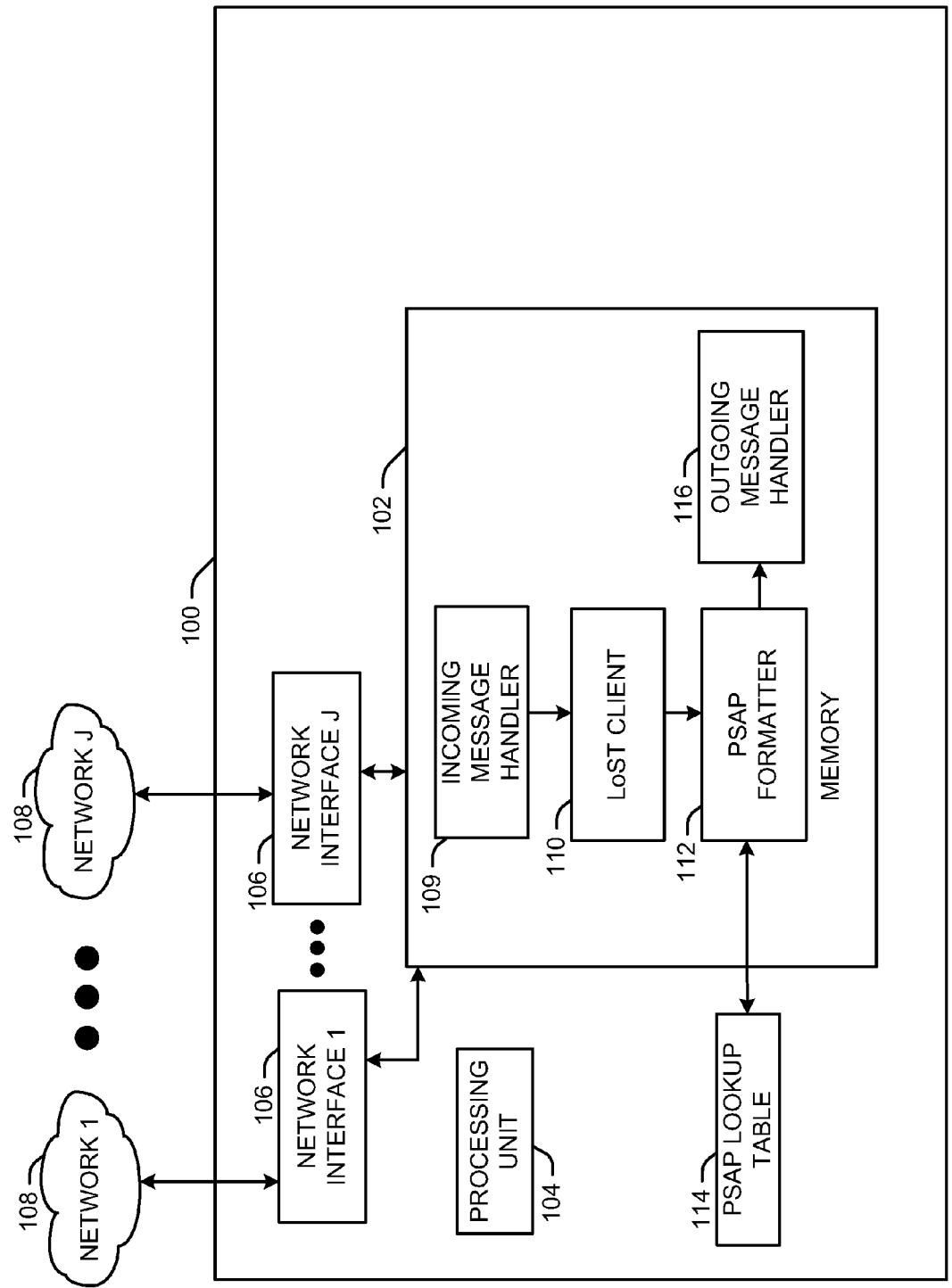
FIG. 2 illustrates an example of a gateway that receives and processes emergency event messages.

FIG. 2 illustrates an example of a gateway 100 (or distributor) that could be employed, for example to implement the gateway 56 illustrated in FIG. 1. The gateway 100 can include a memory 102 that can store machine readable instructions. The memory 102 could be implemented, for example, as non-transitory computer readable media, such as volatile memory (e.g., random access memory), nonvolatile memory (e.g., a hard disk drive, a solid state drive, flash memory, etc.) or a combination thereof. The gateway 100 can also include a processing unit 104 to access the memory 102 and execute the machine-readable instructions. The processing unit 104 can include, for example, one or more processor cores. The gateway 100 can include J number of network interfaces 106 configured to communicate with J number of networks 108, where J is an integer greater than or equal to one. Each of the J number of network interfaces 106 could be implemented, for example, as a network interface card. Each of the J number of networks 108 could be implemented for example, as a public network (e.g., the Internet), a private network (e.g., the ESInet) or combination thereof.

The gateway 100 could be implemented, for example in a computing cloud. In such a situation, features of the gateway 100, such as the processing unit 104, the network interface 106, and the memory 102 could be representative of a single instance of hardware or multiple instances of hardware with applications executing across the multiple of instances (i.e., distributed) of hardware (e.g., computers, routers, memory, processors, or a combination thereof). Alternatively, the gateway 100 could be implemented on a single dedicated router and/or server.

The memory 102 can include an incoming message handler 109 that can communicate with the J number of network interfaces 106. In some examples, an emergency event message can be received at the incoming message handler 109 via one of the J number of network interfaces 106. The emergency event message could, for example, be provided from a central station. The emergency event message could be, for example, an ASAP message or other message that characterizes a location and a nature of an emergency event. The emergency event message can characterize an emergency event detected at a central station based on data received from a sensor (e.g., one or more of the N number of sensors 52 illustrated in FIG. 1). In such a situation, the emergency event message can include data that characterizes a nature of the emergency event (e.g., fire, automobile accident, tornado, etc.). The emergency event message can also include location information that characterizes the location of the emergency event (e.g., a civic address and/or geographic coordinates).

The emergency event message (or some portion thereof) can, in some examples, be encapsulated in a packet of a different format, such as an IP packet or a stream of IP packets. In such a situation, the incoming message handler 109 can de-encapsulate the emergency event message. The emergency event message can be provided to a LoST client 110.

In response to receipt of the emergency event message, the LoST client 110 can be configured to extract the location information and a service identifier (e.g., data characterizing a type of emergency services needed) from the emergency event message. Additionally, the LoST client 110 can be configured to query a LoST server to resolve an identity of a particular PSAP CPE that can dispatch emergency services for the emergency event. The query to the LoST server can include the service identifier and location information compatible with the Presence Information Data Format Location Object (PIDF-LO). The location information can be in the form of a civic address (e.g., a street and city address) and/or geographic coordinates that can include latitude, longitude and (in some situations) altitude of the emergency event. The location information and the service identifier of the query can be encoded as a Uniform Resource Name (URN). The LoST server can employ a database to map input values to a URI (e.g., an IP address, a hostname, etc.) for a PSAP CPE and returns the URI along with information such as hints about a service boundary of the PSAP CPE in a response message to the LoST client 110.

FIG. 3 illustrates an example of XML text that could be included with the query to the LoST server (e.g., 60 of FIG. 1) from the LoST client 110 of FIG. 2. In FIG. 3, a service could be mapped to a location using geographic coordinates, for the service associated with the police "urn:service: sos.police". Moreover, FIG. 4 illustrates an example of XML text of a response by the LoST server to the query illustrated in FIG. 4. For instance, in response to the query in FIG. 3, the LoST server could provide a service and information related to that service. In the example illustrated in FIG. 4, the LoST server has mapped the location given by the LoST client 110 for a police service to the New York City Police Department, instructing the LoST client 110 that the New York City Police Department may be contacted via the URIs "sip:nypd@example.com" and "xmpp: nypd@example.com". The LoST server has also given the client a geodetic, two-dimensional boundary for this service. In the Example illustrated in FIG. 4, the mapping was last updated on Nov. 1, 2006 and expires on Jan. 1, 2007. The information can thus indicate that if location information for the emergency event changes beyond the given service boundary or the expiration time has been reached, the LoST client 110 may need to re-query for the information.

As another example, FIG. 5 illustrates alternate XML text that could be included in the query to the LoST server from the LoST client 110 of FIG. 2. In FIG. 5, a service to a location is implemented as civic address location information. In the example of FIG. 5, the LoST client 110 requests the service associated with police "urn:service:sos.police" along with a specific civic address, namely house number 6 on a street named Otto-Hahn-Ring in Munich, Germany. Moreover, FIG. 6 illustrates an example of XML text of a response by the LoST server to the query illustrated in FIG. 5. For instance, in response to the query in FIG. 5, the LoST server could respond with a service and information related to that service. In FIG. 6, the LoST server has mapped the location given by the client for a police service to the Muenchen Polizei-Abteilung, instructing the LoST client 110 that the LoST client 110 may contact the service via the URIs "sip:munich-police@example.com" and "xmpp:munich-police@example.com". The LoST server has also given the LoST client 110 a civic address boundary (the city of Munich) for this service. In the example, the mapping was last updated on Nov. 1, 2006 by the authoritative source "polizei.muenchen.de.example" and expires on Jan. 1, 2007. This instructs the LoST client 110 to re-query the LoST server if the location for the emergency event changes beyond the given service boundary (e.g., beyond the indicated district of Munich) or after Jan. 1, 2007.

Referring back to FIG. 2, it is noted that the LoST server can be programmed such that errors in a civic address need not cause a rejection of a request. For instance, a LoST server can be configured such that a request for a PSAP CPE that services "123 First Street" could still provide a valid (error correcting) response where the associated city only has a "123 First Avenue".

It is noted that in situations where the LoST server is unable to resolve the query, the LoST server may in turn query a different LoST server and/or return the address of a LoST server in the response message, identified by a LoST server name. In such a situation, the name of the server returned by the queried LoST server can be the same or a different LoST server. In situations where the LoST server returns the name of a different LoST server, the LoST client 110 can repeat the query to the different LoST server, and this process can be repeated until the URI of the PSAP CPE is resolved and returned.

In situations where the LoST server returns the name of the same LoST server, the same LoST server can be sent a new refined query. The refined query can be more specific than a previous query. For instance, if the previous query included a service identifier of "urn:sos:sensors", the refined query could include a service identifier of "urn:sos.fire: sensors". Additionally or alternatively, the same query with different inputs for the query can be employed by the LoST client 110 to generate the refined query. As another alternative, the same query with different credentials can be employed by the LoST client 110 to generate the refined query.

Upon receiving a URI identifying the PSAP CPE (or multiple URIs for PSAP CPEs), which can be referred to as an identified PSAP CPE, the LoST client 110 can provide the emergency event message and the URI received from the LoST server to a PSAP formatter 112. The PSAP formatter 112 can access a PSAP lookup table 114 to identify operational characteristics of the identified PSAP CPE. The PSAP lookup table 114 can be, for example, a database, an index table, a lookup table, etc. In some examples, the PSAP lookup table 114 can be stored on an external system. Operational characteristics of the identified PSAP can include, but are not limited to the type of protocol employed by the identified PSAP CPE, the type of information employed by the identified PSAP CPE, etc.

The PSAP formatter 112 can generate a message for the identified PSAP CPE based on the operational characteristics of the identified PSAP CPE as well as the features of the emergency event message. In some examples, the PSAP formatter 112 can encapsulate the emergency event message into an IP packet (or a stream of IP packets). In other examples, the PSAP formatter 112 can extract data from the emergency event message and reformat the data in a manner understandable by the identified PSAP CPE to generate an output message.

In one example, such as a situation where the identified PSAP CPE is a CAD workstation, and the emergency event message is an ASAP message the PSAP formatter 112 can simply pass-through (e.g., distribute) the ASAP message to generate the output message. In another example where the identified PSAP CPE is a call center workstation that complies with NEMA i3 architectural standards, and the emergency event message is an ASAP message, the PSAP formatter 112 can format the ASAP message into a message that complies with the SIP/MSRP format to generate the output message. In yet another example where the identified PSAP CPE is a web browser workstation that operates on an IP network (e.g., the Internet), and the emergency event message is an ASAP message, the PSAP formatter 112 can format the message as a Hypertext Transfer Protocol Secure (HTTPS) message to generate the output message. In still yet another example where the identified PSAP CPE is a text-to-911 workstation and/or a TTY workstation that operates on an IP network (e.g., the Internet), the PSAP formatter 112 can extract the relevant text data from the emergency event message and incorporate a text message in the output message. Thus, in any of these scenarios, the PSAP formatter 112 can generate the output message that can be provided to an outgoing message handler 116 along with the URI of the identified PSAP CPE.

The outgoing message handler 116 can examine the output message and the URI of the identified PSAP CPE to identify which network 108 (or networks) of the J number of networks 108 to which the identified PSAP CPE is connected. In response to making such a determination, the outgoing message handler 116 can forward the identified PSAP CPE the output message via the identified network. An operator at the identified PSAP CPE can then take appropriate action (e.g., dispatch emergency services).

In some examples, upon taking certain action, the identified PSAP CPE can send a status message to the gateway 100. For instance, the status message could be a status of the emergency event (e.g., police dispatch to automobile accident, fire department dispatched to fire, etc.). In such a situation, the status message could be received at the incoming message handler 109. The incoming message handler 109 can identify the corresponding incoming message to identify the central CPE that provided original the emergency event message. The status message can be sent to the outgoing message handler 116 and the outgoing message handler 116 can send the status message to the identified central CPE.

By employing the gateway 100, multiple different types of PSAP CPE can be serviced from the same distribution point. Moreover, employment of the gateway 100 can eliminate the need for proprietary hardware (e.g., an ASAP adapter card) at the PSAP CPE. Furthermore, inherent difficulties with ASAP messages can be reduced or eliminated by leveraging the services of a LoST server.

Figure 7:
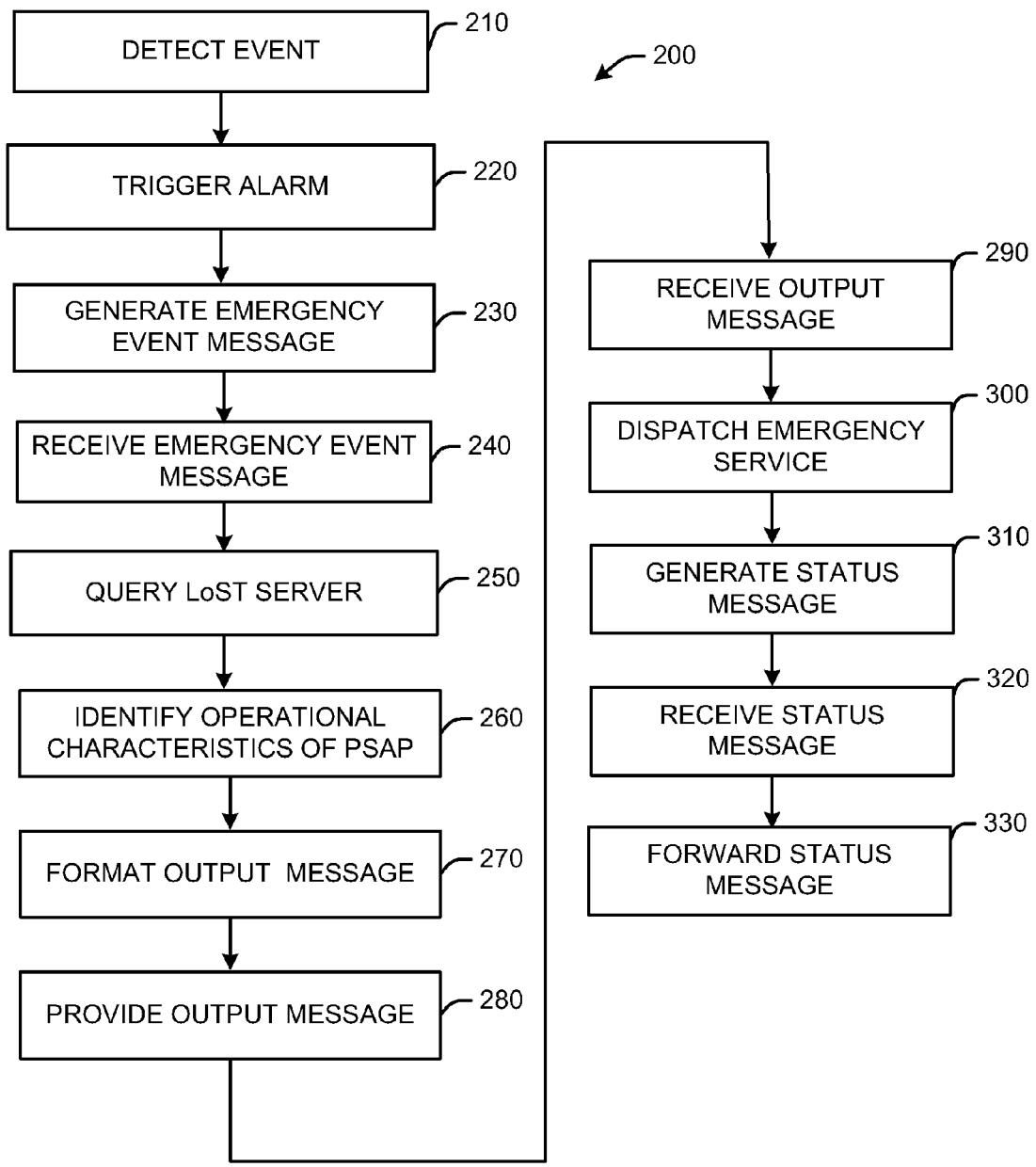
FIG. 7 illustrates an example of a flowchart of an example method for generating and deploying an emergency event message.
Figure 8:
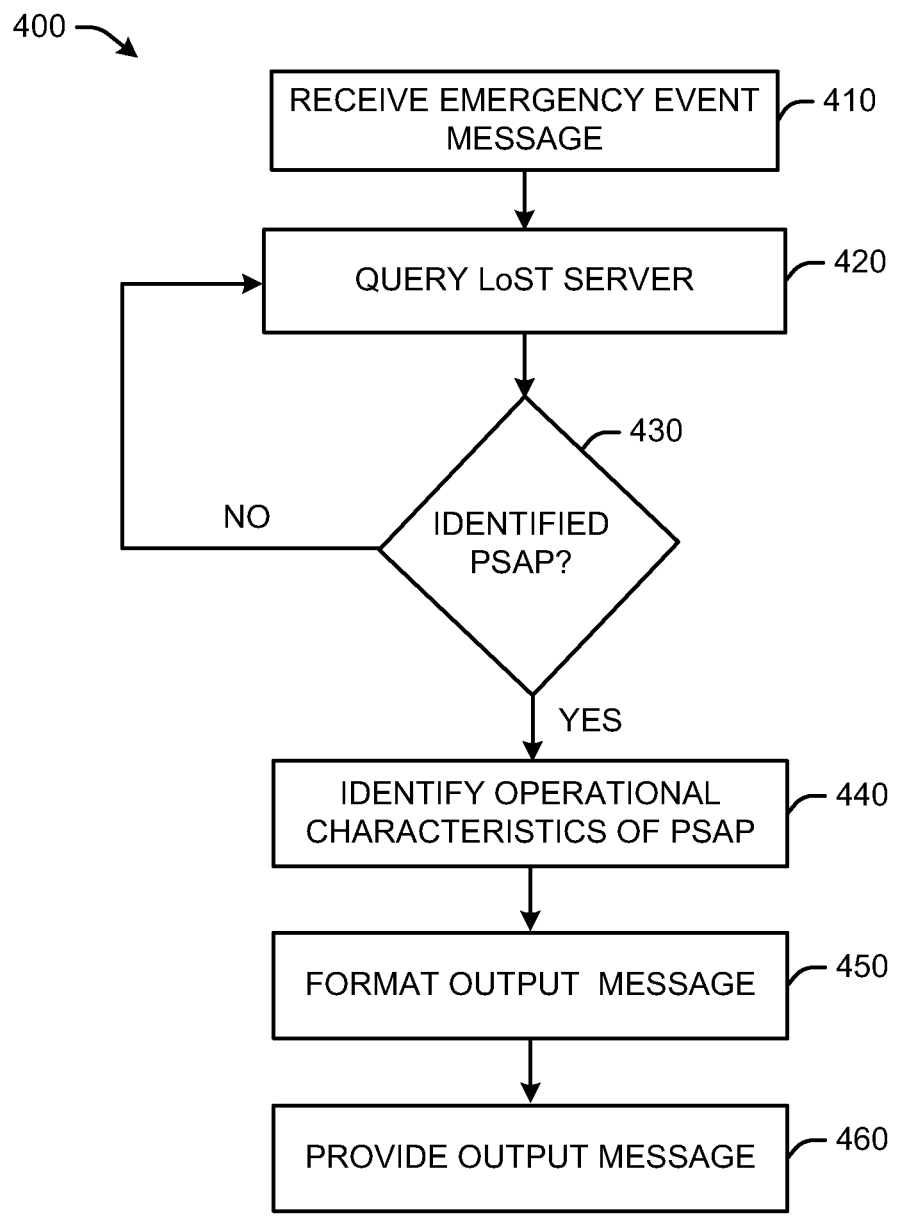
FIG. 8 illustrates an example of a flowchart of an example method for processing an emergency event message.

In view of the foregoing structural and functional features described above, example methods will be better appreciated with reference to FIGS. 7 and 8. While, for purposes of simplicity of explanation, the example methods of FIGS. 7 and 8 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 7 and 8 can be implemented as instructions stored in a non-transitory machine-readable medium. The instructions can be accessed by a processing resource (e.g., one or more processor cores) and executed to perform the methods disclosed herein.

FIG. 7 illustrates an example of a method 200 for deploying emergency event messages. The method 200 could be implemented, for example, by the system 2 illustrated in FIG. 1 and/or the gateway 100 illustrated in FIG. 2. At 210, an event can be detected (e.g., at a sensor 52 of FIG. 1). At 220, an alarm can be triggered (e.g., by the sensor). Triggering of the alarm can include, for example, providing a signal to a central station (e.g., the central station 54 of FIG. 1) that characterizes the event detected (e.g., raw data) and an identification of the sensor. At 230, an emergency event message can be generated (e.g., by the central station). The emergency event message could be, for example an ASAP message that characterizes a location (e.g., a civic address and/or geographic coordinates) and a nature of an emergency event.

At 240, the emergency event message can be received (e.g., by the gateway (distributor) 100 of FIG. 2). At 250, a LoST server can be queried (e.g., by the LoST client 110 of FIG. 2) for an instance of a PSAP CPE to service the emergency event to provide a URI of an identified PSAP CPE. As noted, the LoST server can be queried multiple times and in some examples, multiple LoST servers can be queried. At 260, operational characteristics of the identified PSAP CPE can be determined based on the URI of the identified PSAP CPE and information stored in a lookup table and/or a database (e.g., the PSAP lookup table 114 of FIG. 2). At 270, an output message based on the emergency event message and the operational characteristics of the identified PSAP CPE can be formatted (e.g., by the PSAP formatter 112 of FIG. 2). At 280, the output message can be provided via a network to the identified PSAP CPE (e.g., by the outgoing message handler 116 of FIG. 2).

At 290, the output message can be received (e.g., at the identified PSAP CPE). At 300, emergency services can be dispatched (e.g., by a user of the identified PSAP CPE) based on data included in the output message. At 310, a status message can be generated (e.g., by the identified PSAP CPE) that characterizes an action taken at the identified PSAP CPE to resolve the emergency event (e.g., police and/or fire services deployed). At 320, the status message can be received (e.g., at the gateway). At 330, the status message can be forwarded to the call center (e.g., by the gateway).

FIG. 8 illustrates an example of a method 400 for actions execute to deploy a received emergency event message. The method 400 can be implemented, for example, by the gateway 56 of FIG. 1 and/or the gateway 100 of FIG. 2. At 410, an emergency event message can be received (e.g., at one of the J number of network interfaces 106 of FIG. 2). The emergency event message could be, for example, an ASAP message. In some such examples, the ASAP message could be encapsulated in another format, such as an IP packet, an SIP/MSRP packet, etc. The emergency event message could be provided, for example, from a central station (e.g., the central station 54 of FIG. 1). The emergency event message can include, for example, location information corresponding to a location of an emergency event and a data characterizing a nature of the emergency event.

At 420, a LoST server (e.g., the LoST server 60 of FIG. 1) can be queried (e.g., by the LoST client 110 of FIG. 2) for a PSAP CPE that can service the emergency event message (an identified PSAP CPE). The LoST server can respond with data that characterizes a URI of the identified PSAP CPE, a URI of another LoST server or the URI of the same LoST server. At 430, a determination can be made (e.g., by the LoST client) as to whether a URI for the identified PSAP CPE has been received from the LoST server. If the determination at 430 is positive (e.g., YES), the method can proceed to 440. If the determination at 430 is negative (e.g., NO), the method can return to 420.

At 440, operational characteristics of the identified PSAP CPE can be determined (e.g., by the PSAP formatter 112 of FIG. 2), for example by querying a lookup table (e.g., the PSAP lookup table 114) with the URI of the identified PSAP. Such operational characteristics can include, for example data characterizing the format of data employable by the identified PSAP CPE. At 450, based on the operational characteristics of the identified PSAP CPE and the emergency event message, an output message can be formatted (e.g., by the PSAP formatter). At 460, the output message can be provided to the identified PSAP CPE (e.g., the outgoing message handler 116 of FIG. 2) via a network coupled to the identified PSAP CPE.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A gateway comprising one or more computers having machine readable instructions, the gateway being configured to:
   receive an emergency event message in a predefined format via a network, wherein the emergency event message characterizes a location and a nature of an emergency event and the location characterizes at least one of geographic coordinates and a civic address;
   identify a particular Public Safety Answering Point (PSAP) customer premise equipment (CPE) of a plurality of PSAP CPEs to service the emergency event based on the location or the nature of the emergency event;
   determine a format of messages employable by the particular PSAP CPE; and
   provide the particular PSAP CPE with an output message in the format employable by the particular PSAP CPE, wherein the output message characterizes the nature and the location of the emergency event.

2. The gateway of claim 1, wherein the emergency event message comprises an Automated Secure Alarm Protocol (ASAP) message.

3. The gateway of claim 2, wherein the output message comprises an Internet Protocol (IP) message.

4. The gateway of claim 3, wherein the output message further comprises a Hypertext Transfer Protocol Secure (HTTPS) message.

5. The gateway of claim 3, wherein the output message further comprises a Hypertext Transfer Protocol (HTTP) message.

6. The gateway of claim 2, wherein the output message comprises an Extensible Markup Language (XML) message.

7. The gateway of claim 2, wherein the output message comprises a Session Initiation Protocol (SIP) message that conforms to the Message Session Relay Protocol (MSRP).

8. The gateway of claim 7, wherein the output message is provided to the particular PSAP CPE via an Emergency Services Internet Protocol network.

9. The gateway of claim 7, wherein the emergency event message is a given emergency event message, and the particular PSAP CPE is a given PSAP CPE, the gateway being further configured to:
   receive another emergency event message via the network, wherein the emergency event message characterizes a location and a nature of another emergency event; and
   identify another PSAP CPE to service the other emergency event; and
   provide the other PSAP CPE with another output message in a format employable by the other PSAP CPE, wherein the other output message is provided to the other PSAP CPE via the Internet.

10. The gateway of claim 9, wherein the other output message comprises a Hypertext Transfer Protocol Secure (HTTPS) message.

11. The gateway of claim 1, wherein the emergency event message comprises a short message service (SMS) Message.

12. The gateway of claim 1, wherein the emergency event message comprises a session initiation protocol (SIP) message.

13. The gateway of claim 1, wherein the emergency event message comprises an Extensible Messaging and Presence Protocol (XMPP) message.

14. The gateway of claim 1, wherein the emergency event message comprises an alarm panel protocol.

15. The gateway of claim 1, wherein the emergency event message is received from a central station that receives signals from a plurality of sensors.

16. The gateway of claim 1, wherein the gateway is further configured to query a given Location-to-Service Translation Protocol (LoST) server to facilitate the identifying of the particular PSAP CPE.

17. The gateway of claim 16, wherein the gateway is further configured to query another LoST server to facilitate the identifying of the particular PSAP CPE.

18. The gateway of claim 16, wherein the gateway is further configured to query the given LoST server multiple times to facilitate the identifying of the particular PSAP CPE.

19. The gateway of claim 16, wherein the LoST server is configured to provide a uniform resource identifier (URI) corresponding to the particular PSAP CPE.

20. The gateway of claim 16, wherein the LoST server is configured to provide a uniform resource identifier (URI) corresponding to the particular next hop network routing node in the path to the particular PSAP CPE.

21. A system comprising:
   a memory configured to store machine readable instructions; and
   a processing unit configured to access the memory and execute the machine readable instructions, the machine readable instructions comprising:
     a message handler configured to receive a plurality of emergency event messages transmitted over a network, wherein each of the plurality of the emergency event messages comprises a message in a given format that characterizes a location and a nature of a corresponding emergency event of a plurality of emergency events and the location characterizes at least one of geographic coordinates and a civic address; and
     a Public Safety Answering Point (PSAP) formatter configured to generate a plurality of output messages for a respective plurality of PSAP CPEs to service the plurality of emergency events, wherein each of the output messages is based on a corresponding emergency event message and each of the output messages is in a format readable by a corresponding PSAP CPE of the plurality of PSAP CPEs,
wherein the corresponding PSAP CPE is selected based on the location or the nature of the corresponding emergency event.

22. The system of claim 21, wherein at least two of the output messages are in different formats.

23. The system of claim 21, further comprising a Location-to-Service Translation Protocol (LoST) client configured to query a LoST server to identify each of the plurality of PSAPCPEs.

24. A method comprising:
receiving an emergency event message from a central station or sensor, wherein the emergency event message includes location information that characterizes at least one of geographic coordinates and a civic address for an emergency event;
querying, in response to the emergency event message, a server to identify a particular Public Safety Answering Point (PSAP) customer premise equipment (CPE) of a plurality of PSAP CPEs to service the emergency event corresponding to the emergency event message based on the location or the nature of the emergency event; and
formatting the emergency event message into an output message in a format readable by the particular PSAP CPE.

25. The method of claim 24, wherein the emergency event message comprises an Automated Secure Alarm Protocol (ASAP) message.

26. The method of claim 25, wherein the output message comprises one of an Internet Protocol (IP) message and a Session Initiated Protocol (SIP) message.

27. The method of claim 25, further comprising determining, based on a response to the query, a format of messages employable by the particular PSAP.

28. The method of claim 25, wherein the server is a Location-to-Service Translation Protocol (LoST) server.

* * * * *